Patented May 27, 1947

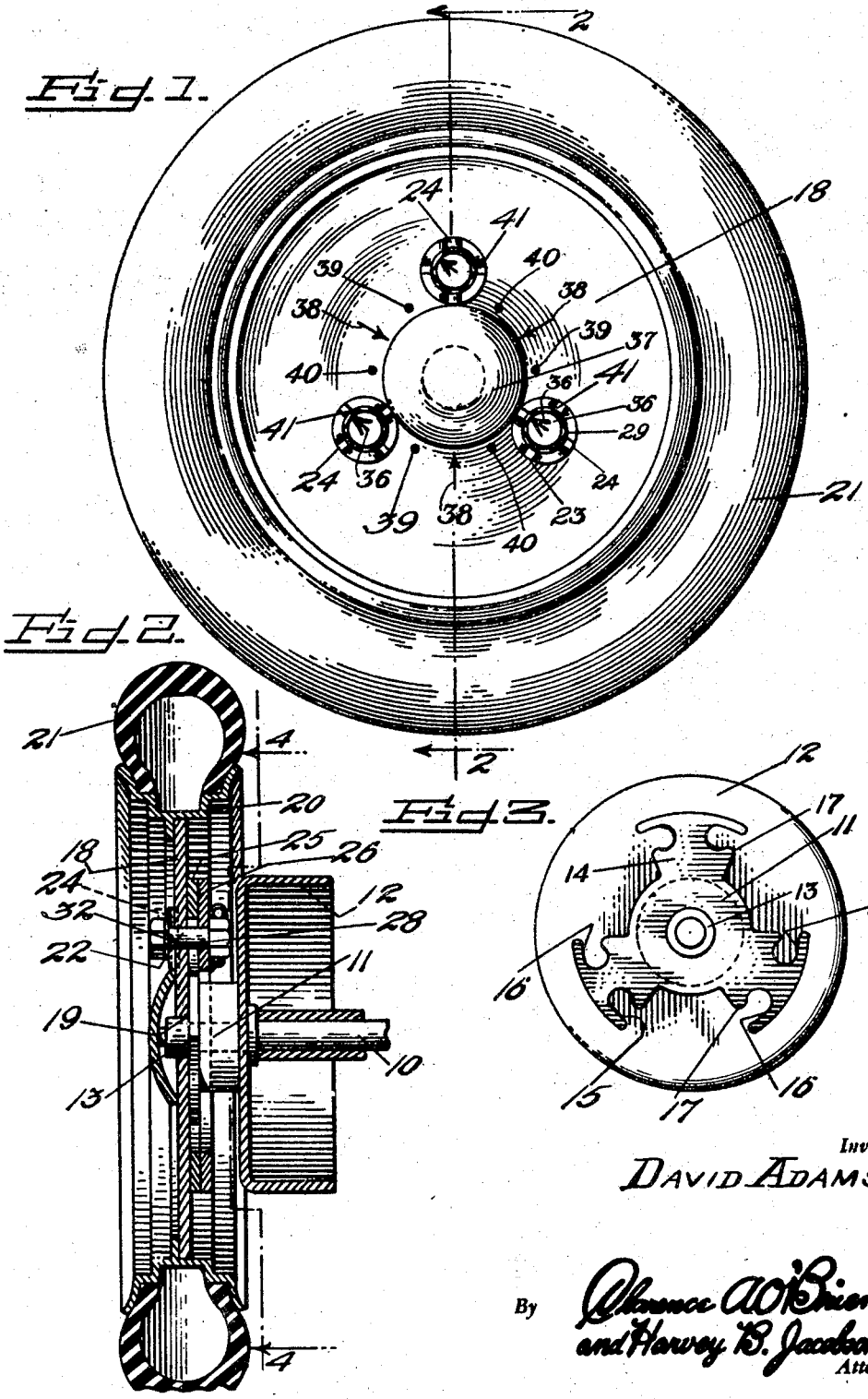

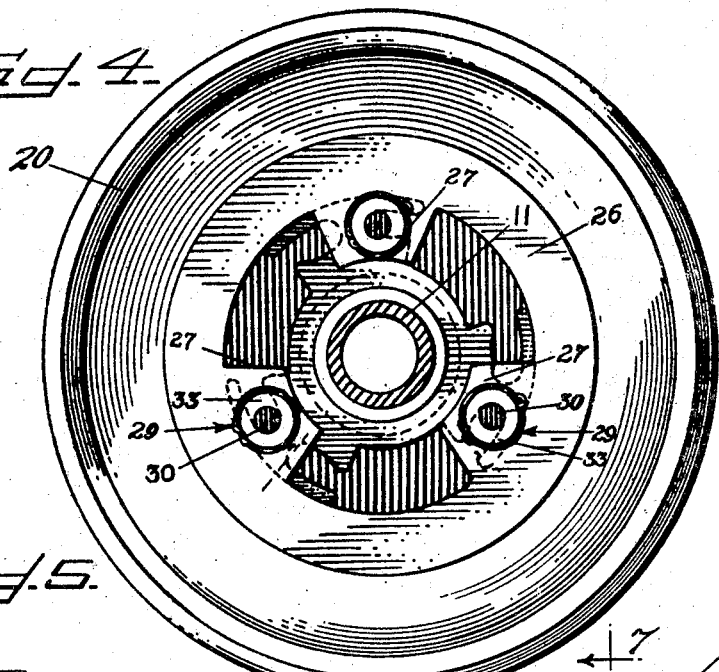
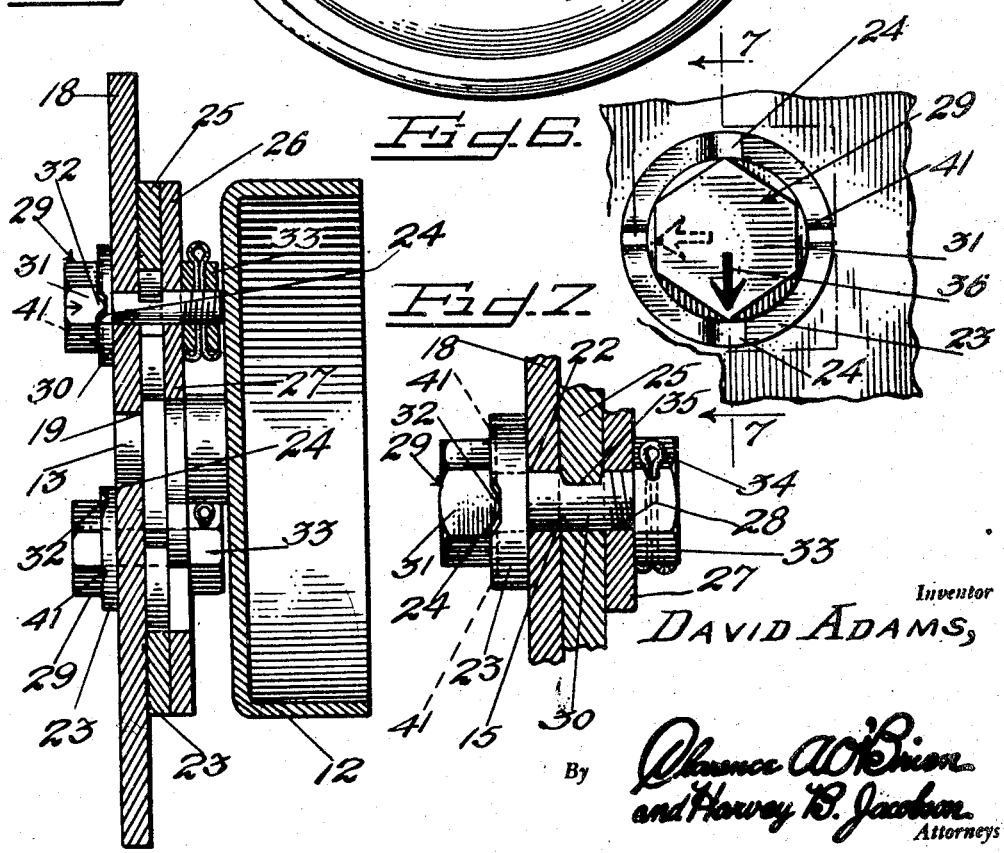

2,421,176

UNITED STATES PATENT OFFICE 2,421,176

DEMOUNTABLE WHEEL

David Adams, Detroit, Mich.

Application November 20, 1945, Serial No. 629,758

6 Claims. (Cl. 301—9)

This invention relates to a demountable wheel, and more particularly to wheels equipped with pneumatic tires such as are commonly employed on motor vehicles.

The primary object of the invention is to facilitate the rapid change of wheels should a tire become defective through a blowout, or for any other reason.

Another object is to conserve the time and much of the labor required to change wheels should the tire become defective.

The above and other objects may be attained by employing this invention which embodies among its features a hub having a plurality of radiating arms, each of which has an arcuate, cam-receiving slot near its free end, the axes of which lie concentric with the axis of the hub, a wheel disk and an annular series of spaced cams carried by the wheel disk for entering into the slots to lock the wheel disk to the hub and effect driving connection between the hub and the wheel disk.

Other features include means to rotate each cam about its own axis to effect the locking of the wheel disk to the hub.

Still other features include an axial boss on the hub which serves as a guide in mounting the wheel disk, and about which the wheel disk may be rotated to cause the cams to enter the slots in the arms on the hub during the mounting of the wheel disks thereon.

In the drawings—

Figure 1 is a side view of a wheel embodying the features of this invention,

Figure 2 is a vertical sectional view taken substantially on the line 2—2 of Figure 1, Figure 3 is a side view of the hub showing the radiating arm to which the wheel disk is locked, Figure 4 is a vertical sectional view taken substantially on the line 4—4 of Figure 2 with the tire removed, Figure 5 is an enlarged transverse sectional view of the hub and wheel disk with the tire mounting rim removed, Figure 6 is an enlarged fragmentary side view illustrating one of the locking cams and the indexing means thereon, and Figure 7 is a vertical sectional view taken substantially on the line 7—7 of Figure 6.

Referring to the drawings in detail, a wheel axle 10 has mounted thereon a hub 11 carrying the usual brake drum 12 and equipped with an outwardly extending, axial boss 13. Radiating from the hub 11 adjacent the axial boss 13 are arms 14, adjacent the outer ends of which are arcuate slots 15 and 16 with the slot 15 opening on one side of each arm, while the slot 16 opens from the other side of each arm. Each slot is provided, adjacent its outer end or mouth, with a cam lug 17, the purpose of which will be more fully hereinafter described.

A wheel disk 18 is provided with an axial opening 19 of a size to receive the boss 13, and extending peripherally around said disk is a rim 20 upon which a conventional pneumatic tire 21 is adapted to be mounted. Formed in the disk 18 in concentric relation to the opening 19 is an annular row of spaced openings 22 and secured to the outer face of the disk 18 in concentric relation to each opening 22 is a collar 23 having a transversely extending depression 24 in its outer face. Secured to the inner face of the wheel disk 18 in spaced, concentric relation to the annular series of openings 22 is a ring 25 carrying a guard ring 26 having inwardly extending lugs having openings 28 in axial alignment with the openings 22 to receive the locking cams, to be more fully hereinafter described. The lugs 27 are spaced from one another a distance sufficient to accommodate the arms 14 when mounting or de-mounting the wheel on the hub.

Extending transversely through the aligned openings 22 and 28, and mounted for rotation axially thereof are cam members, designated generally 29, each of which comprises a shank or shaft 30 carrying, at its outer end, a head 31, preferably of hexagonal formation to accommodate a wrench of any conventional type. Formed on the inner face of the head is a transversely extending rib 32 which, when the head is turned in one position, is adapted to seat in the groove 24 formed in the collar 23. Threaded on the inner end of the shank 30 of each cam 29 is a nut 33 which is held against rotation by means of a cotter pin 34 which extends transversely through the nut and shank as illustrated in Figures 5 and 7. Formed intermediate the ends of the shank 30 is a cam groove 35 which, when the cam 29 is rotated into locked position, engages the wall of its respective slot 15 or 16 in a radial arm 14 to lock the wheel in place on the hub. Formed on the outer face of the head 31 in alignment with the rib 32 is an index figure 36 which, in the present instance, takes the form of an arrow head so as to indicate when the cam is in locked or unlocked position.

In operation, when it is desired to mount a wheel on the hub 11, the wheel disk 18 is first placed in such position that the boss 13 will enter the opening 19, after which the wheel may be rotated with relation to the hub until the lugs 27 will pass between the radiating arms 14 on the hub. The wheel is then pushed inwardly so that the shanks 30 of the cams 29 may enter the slots 15 or 16 and then, by rotating the wheel disk 18 relative to the hub 11, the shanks 30 may be moved into the slots. If the wheel is rotated in a clockwise direction relative to the hub 11, the cam shanks 30 will enter the slots 15, or if the wheel disk is rotated in a counter-clockwise direction, the cam shanks 30 will enter the slots 16. Having entered the shanks 30 in their respective slots, the heads 31 are rotated to cause the cam grooves 35 to turn in such a position that the shanks 30 are held between the lugs 17 and the outer sides of the slots so as to prevent the wheel from rotating relative to the hub. When the cam slots 35 are in proper position, the ribs 32 will engage in their respective grooves 41, and the cams 29 will be held against accidental rotation. A visual indication of the locking of the cams 29 is evidenced by the alignment of the index 36 with the groove 41 and the unlocked position of the cams 29 is indicated by the index 36 lying perpendicular to the axis of the groove 41. Not only is a visual signal thus given, but due to the riding of the rib 32 out of the groove 24, the resistance offered thereby may be readily employed to give a signal by the feel imparted to the wrench or other instrument employed in turning the head 31.

In order to indicate the locked position of the wheel disk, I provide an index arrow head 37 on the hub which cooperates with arrow heads 38 on the wheel disk 18 which, when the latter align with the arrow head 37, indicate that the wheel is unlocked. In order to tell in which direction to rotate the locked wheel after unlocking the cams 29, the wheel disk is provided on opposite sides of the arrow heads 38 with dots 39 and 40. If any one of the dots 39 aligns with the arrow head 37, it indicates that in order to remove the wheel it will be necessary to rotate it counter-clockwise with relation to the hub 11, whereas if any one of the dots 40 aligns with the arrow head 37, the indication is given that the wheel must be rotated in a clockwise direction in order to release it from the hub 11.

In order to hold the cam shanks against accidental rotation when they are in locked position, I provide shallow cross grooves 41 in the outer faces of the collars 23 which lie along axes perpendicular to the axes of the grooves 24.

From the foregoing, it will be obvious that a simple and effective locking mechanism for demountable wheels is provided which will save a great deal of time in changing tires or removing wheels for any other purposes.

While in the above I have described the arms 14 as radiating from the hub, and the guard ring 26 as being carried by the wheel disk, it is to be understood that a reversal of the parts may be employed when conditions so warrant, as, for instance, attaching the radiating arms 14 to the wheel disk and having the guard ring 26 and the locking cams 29 carried by the hub or drive element so as to facilitate the use of the device upon vehicles equipped with dual wheels. While it is recognized that minor alterations in the structure will be involved, it is obvious that the same principles may be employed irrespective of whether the arms 14 constitute the driving or the driven elements.

While in the foregoing, there has been shown and described the preferred embodiment of this invention, it is to be understood that minor changes in the details of construction and combination and arrangement of parts may be resorted to without departing from the spirit and scope of the invention as claimed.

Having thus described the invention, what I claim is:

1. A demountable wheel comprising a hub, arms radiating from the hub, each arm having at least one cam-receiving slot near its free end, the axes of the slots lying concentric with the axis of the hub, a wheel disk and an annular series of cams carried by the wheel disk for entry into the slots to lock the wheel disk to the hub and effect driving connection between the hub and wheel disk.

2. A demountable wheel comprising a hub, arms radiating from the hub, each arm having at least one cam-receiving slot near its free end, the axes of the slots lying concentric with the axis of the hub, a wheel disk and an annular series of cams carried by the wheel disk for entry into the slots, and means to rotate each cam about its own axis to lock the wheel disk to the hub and effect driving connection between the hub and wheel disk.

3. A demountable wheel comprising a hub, an axial boss on the hub, arms radiating from the hub, each arm having at least one cam-receiving slot near its free end, the axes of the slots lying concentric with the axis of the hub, a wheel disk having an axial opening adapted to receive the boss on the hub, and an annular series of cams carried by the wheel disk for entry into the slots to lock the wheel disk to the hub and effect driving connection between the hub and the wheel disk.

4. A demountable wheel comprising a hub, an axial boss on the hub, arms radiating from the hub, each arm having at least one cam-receiving slot near its free end, the axes of the slots lying concentric with the axis of the hub, a wheel disk having an axial opening adapted to receive the boss on the hub, and an annular series of cams carried by the wheel disk for entry into the slots to lock the wheel disk to the hub, and means to rotate each cam about its own axis to lock the wheel disk to the hub and effect driving connection between the hub and wheel disk.

5. A demountable wheel comprising a hub, arms radiating from the hub, each arm having at least one cam-receiving slot near its free end, the axes of the slots lying concentric with the axis of the hub, a wheel disk and an annular series of cams carried by the wheel disk for entry into the slots, means to rotate each cam about its own axis to lock the wheel disk to the hub and effect driving connection between the hub and wheel disk, and means to indicate the locked or unlocked position of each cam.

6. A demountable wheel comprising a hub, an axial boss on the hub, arms radiating from the hub, each arm having at least one cam-receiving slot near its free end, the axes of the slots lying concentric with the axis of the hub, a wheel disk having an axial opening adapted to receive the boss on the hub, and an annular series of cams carried by the wheel disk for entry into the slots to lock the wheel disk to the hub, means to rotate each cam about its own axis to lock the wheel disk to the hub and effect driving connection between the hub and wheel disk, and means to indicate the locked or unlocked position of each cam.

DAVID ADAMS.

REFERENCES CITED

The following references are of record in the file of this patent:

UNITED STATES PATENTS

| Number | Name | Date |
| --- | --- | --- |
| 1,353,511 | Baumgartl | Sept. 21, 1920 |
| 2,148,707 | Notson | Feb. 28, 1939 |